Figure 1:
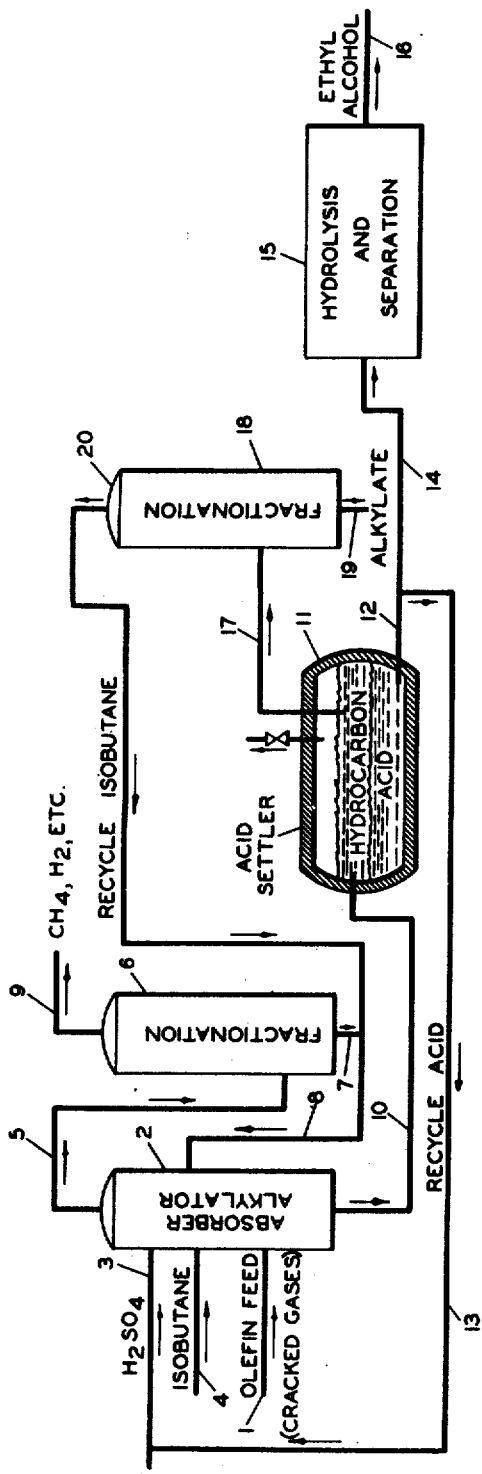

June 13, 1950 P. M. ARNOLD 2,511,810
PRODUCTION OF ETHYL ALCOHOL AND ALKYLATE
Filed Sept. 7, 1945

INVENTOR.
P. M. ARNOLD
BY Hudson & Young
ATTORNEYS

Patented June 13, 1950

2,511,810

UNITED STATES PATENT OFFICE 2,511,810

PRODUCTION OF ETHYL ALCOHOL AND ALKYLATE

Philip M. Arnold, Bartlesville, Okla., assignor to Phillips Petroleum Company, a corporation of Delaware Application September 7, 1945, Serial No. 615,037

15 Claims. (Cl. 260—639)

This invention relates to a process for the production of ethyl alcohol and alkylate, i. e., branched chain paraffins having seven or more carbon atoms per molecule, from gases containing ethylene and higher aliphatic olefins such as propylene, butylenes and possibly amylenes, and an isoparaffin especially isobutane. Such gases are obtained by cracking processes, either as the gas produced as by-product in the cracking of normally liquid feeds such as crude oil, gas oil, etc., or as the principal product in the cracking of ethane, propane, butane or mixtures of two or more thereof.

The production of ethyl alcohol by the hydration of ethylene in the presence of sulfuric acid is old in the art. However, the principal problem connected with this method of ethanol synthesis has been a source of ethylene of adequate purity and of low cost. It is well known that ethylene is produced in large quantities as a by-product from the cracking of petroleum distillates. It is also known that ethylene produced in this way or by cracking operations directed specifically to the production of ethylene, is invariably contaminated with other olefins such as propylene and the various butylenes. The employment of such impure gas streams in hydration reactions results in a product contaminated with isopropyl and butyl alcohols which presents an extremely difficult purification problem. In the past it has been found that purification of the ethylene feed is preferable to purification of the final product. Conventionally, selected cracked gases have been stripped of all components heavier than ethane by contact with an absorption agent such as mineral seal oil prior to the hydration operation. The absorption system required to accomplish this separation is expensive both as to investment and operation thus greatly increasing the cost of synthetic ethanol from this source.

The principal object of the present invention is to provide an improved process for the production of ethyl alcohol from gas containing ethylene and at least one higher olefin, especially cracked petroleum gases. Another object is to selectively convert the ethylene contained in cracked petroleum gases to ethyl alcohol of high purity. Another object is to provide a unitary combination process operating on refinery cracked gases and producing therefrom as primary products ethyl alcohol and alkylate gasoline. Another object is to provide a process of the foregoing type which operates in a simple and economical manner and requires a minimum of equipment. Another object is to accomplish the conversion of ethylene in cracked petroleum gases to ethyl alcohol concomitantly with conversion of propylene and higher olefins contained therein to valuable alkylate, with a minimum of change in and addition of equipment to the usual alkylation plant. Another object is to provide a process of the foregoing type wherein the expense and inconvenience of the conventional removal of propylene and higher olefins in the manufacture of ethyl alcohol from ethylene-containing gases are eliminated in a peculiarly advantageous manner. Another object is to provide a process of the foregoing type which utilizes the same material as alkylation catalyst and as ethylene esterification and hydration agent. Another object is to provide a process which utilizes the same material as the absorption liquid for the separation of the olefins from the olefin containing stream, as the catalyst for alkylation, and as the ethylene esterification agent. Another object is to provide a process as in the foregoing which enables use of a simple recovery system for recovering the products. Numerous other objects of the present invention will be apparent to those skilled in the art from a consideration of the following description.

Figure 2:
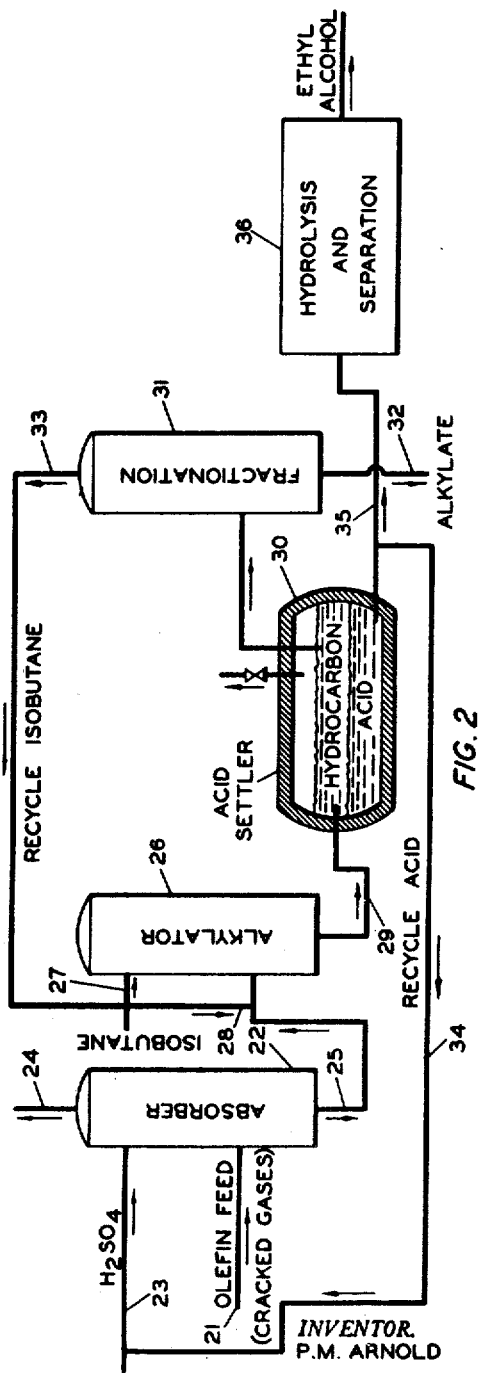

In the accompanying drawings, Fig. 1 portrays diagrammatically one arrangement of equipment which may be used in carrying out the present invention. In this embodiment the olefin absorption and the alkylation steps are carried out in a single unit and substantially in a single zone. Fig. 2 portrays another embodiment of the invention wherein the absorption and alkylation zones are carried out separately.

Prior art methods of making ethyl alcohol from olefin containing gases involve the selective absorption of propylene and higher olefins in sulfuric acid solutions of varying concentrations, followed by absorption of the ethylene in concentrated acid and hydrolysis of the resulting ethyl hydrogen sulfate. Higher alcohols, especially propyl alcohols, are present as impurities in the ethyl alcohol produced in this way because of the incomplete removal of propylene, etc., from the ethylene stream. The present invention, by providing for more complete removal of propylene and higher olefins by means of the alkylation reaction, yields ethyl alcohol of higher purity.

In accordance with the present invention ethylene contained in a mixture also containing at least one higher aliphatic olefin is converted to ethyl alcohol and the higher olefin is caused to alkylate an alkylatable isoparaffin hydrocarbon to give higher boiling isoparaffin hydrocarbons of the type known as alkylate. In its broader aspect the process of the present invention comprises absorbing the olefin content of the mixture in an acid which is catalytically active toward the alkylation of isoparaffin with olefins higher than ethylene but normally substantially inactive with respect to alkylation of isoparaffins with ethylene. The ethylene is absorbed by reaction with the acid to form the ethyl ester of the acid. The higher olefin is caused to alkylate the isoparaffin hydrocarbon by means of the acid as an alkylation catalyst. Alkylation with ethylene either as such or in the form of the ethyl ester of the acid is substantially prevented. The ethyl ester of the acid is hydrolyzed to ethyl alcohol, this hydrolysis generally being performed after separation of the alkylation reaction effluent into two layers and after said layers have been separately withdrawn. However, it is within the scope of the invention to carry out the hydrolysis of the ethyl ester before such separation, for example, by adding water to the total alkylation mixture.

Feeds

The hydrocarbon feeds to the present invention are the olefin-containing gas and the isoparaffin. In unusual circumstances the olefin-containing feed may contain a part or all of the isoparaffin. Generally the olefin-containing gas is obtained either as the principal product or as a by-product of a cracking operation. It may be any gas which contains ethylene and at least one higher olefin such as propylene, butylenes, or amylenes. Usually the gas contains substantial or large proportions of at least one gaseous component lighter than ethylene, almost invariably methane or hydrogen, usually both. In exceptional circumstances the olefin-containing mixture employed in carrying out the present invention may be a normally liquid mixture as where it contains a large proportion of $C_5$ hydrocarbons. Almost invariably, however, it is free from $C_5$ hydrocarbons in substantial amount and therefore is normally gaseous. The olefin-containing material may be fed to the process in either liquid or gaseous form, the latter being more commonly employed.

The olefin-containing feed may consist essentially of olefins, namely, ethylene and one or more higher aliphatic olefins. More usually it comprises the olefins and the corresponding paraffins and generally non-condensible gases, especially methane and hydrogen. Generally speaking the paraffins present in the feed are selected from the group consisting of methane, ethane, propane, normal butane and sometimes normal pentane in small amounts. However, the presence of isobutane and/or isopentane in the olefin-containing feed is within the scope of the present invention. If isoparaffin be present in the olefin-containing feed, it may, within the contemplation of the invention, furnish a portion or all of the isoparaffin required in the alkylation step of my invention. One of the advantages of the present invention is that the process effects a concentration of the olefins from inert materials such as hydrogen, methane, ethane, propane, normal butane and normal pentane in a simple and economical manner.

The isoparaffin employed as the hydrocarbon which is alkylated with the olefin higher than ethylene in accordance with the present invention is generally isobutane although it may be isopentane or even isohexane or a mixture of the several isoparaffins. Preferably it is substantially free from normal paraffins. For example, it should not contain more than 10% of normal paraffin. The isoparaffin may be introduced in admixture with the olefin in accordance with one embodiment of my invention wherein the absorption and the alkylation are carried out in a single common zone.

The feeds employed in the present invention should be free from sulfur and sulfur compounds including hydrogen sulfide and mercaptans, and from compounds of nitrogen and oxygen, since such materials would interfere with the alkylation step or cause objectionable contamination of the products.

Absorption step

The absorption step may be conducted as a simple gas scrubbing operation, the cracked petroleum gas or other olefin-containing normally gaseous mixture being introduced at a low point or near the bottom of the absorption zone and being scrubbed countercurrently with the liquid acid which is introduced at the top of the scrubbing zone. The light inert gases usually comprising methane and hydrogen, are undissolved and are withdrawn from the top of the scrubbing zone in any suitable manner. Normally gaseous paraffins heavier than methane are also undissolved and may appear in the scrubbed gases. Such paraffins usually comprise largely ethane, propane, and some butane. Thus, the sulfuric acid selectively dissolves the ethylene and higher olefins from the cracked gas feed.

Desirably suitable measures are taken to prevent excessive loss of olefins in the gas leaving the absorption zone. For example, the overhead gas may be subjected to partial condensation or to fractionation to effect separation of substantially all material heavier than that which is desirable to allow to escape from the system with the methane and hydrogen and the resulting condensate may be returned to the absorption zone. If desired the bottoms product may be reboiled before it is withdrawn from the absorption zone in order to prevent gases lighter than $C_2$ from being dissolved therein. In some cases it may be desirable to partially condense the overhead gases in order to liquefy substantially all of the $C_4$ and heavier or substantially all of the $C_3$ and heavier and in extreme cases a large percentage or substantially all of the $C_2$ and heavier and reflux the top of the absorber with at least a portion of the resulting liquid condensate.

The absorption step is usually conducted under conditions such that substantially all of the ethylene and higher olefin are absorbed in the acid. This absorption involves conversion of ethylene and probably the major part or all of the higher olefins to the corresponding alkyl esters of the absorbing acid. For example, where sulfuric acid is employed, the olefins are converted either to the mono-alkyl sulfate or the dialkyl sulfate or a mixture of both. The absorption step is preferably conducted at pressures of at least 250 pounds per square inch absolute and the pressure may range upwardly from this figure to as high as 2000 pounds per square inch. The temperature of absorption may range from 25–150° C. but is preferably within the range of from 80 to 130° C. Usually the temperature at the top of the absorber will be considerably lower than that at the bottom, especially where the bottoms product is reboiled. The top temperature is preferably sufficiently low that ordinary cooling water can be used.

As the combined absorption liquid and alkylation catalyst, I may use any acid which can be maintained in liquid phase under the conditions employed in the absorption and alkylation steps, which is capable of absorbing ethylene and higher olefins by conversion of at least the ethylene to the ethyl ester of the acid and which is also an active catalyst for the alkylation of isoparaffins with propylene, butylenes and higher, but is substantially inactive with respect to the alkylation of such isoparaffins with ethylene, whether such ethylene is present as such or in the form of the ethyl ester. The acid employed must be one which forms an ethyl ester which is hydrolyzable to ethyl alcohol. The preferred acids meeting the foregoing requisites are concentrated sulfuric acid and substantially anhydrous hydrofluoric acid.

Where sulfuric acid is employed, it preferably has a strength of at least 90% by weight ranging upwardly therefrom to 100%. Frequently 96–98% acid is employed. In the case of hydrofluoric acid it preferably does not contain over 5% by weight of water and more preferably not over 1% by weight of water. Under exceptional circumstances other acids may be employed in the practice of the present invention such as phosphoric acid, chlorosulfonic acid, fluosulfonic acid, or any other acid which meets the above mentioned requirements.

The acid is fed into the top of the absorption zone at a rate such as to absorb substantially all of the olefin contained in the olefin-containing feed. Preferably the acid is employed in substantial molecular excess over the olefin in order to minimize loss of olefin by displacing the equilibrium and so that the excess of acid may function as the catalyst in the alkylation step.

An important feature of the present invention in a more specific aspect resides in the discovery that by the recycle of a portion of sulfuric acid layer separated from the alkylation effluent to the absorption step, the absorption of ethylene is catalyzed by reason of its content of ethyl ester of sulfuric acid especially ethyl hydrogen sulfate. This feature of my invention will be described more fully hereinafter. The acid solution of olefins formed in the absorption step is fed directly to the alkylation step. In cases where the alkylation step is conducted in the same unit wherein the absorption takes place it may be impossible to sharply distinguish the absorption and the alkylation zones since they may be co-extensive at least in part.

Where hydrofluoric acid is employed, it is necessary that conditons in the absorption zone be such that volatilization of hydrofluoric acid or of alkyl fluorides is prevented. The selection of such conditions is a matter well within the skill of the art. The principal requirements are the use of a sufficiently high pressure and a sufficiently low temperature in the absorption step.

*Alkylation step*

The alkylation step of my invention is so conducted as to accomplish alkylation of isoparaffin, generally isobutane, selectively with substantially all of the propylene and any higher olefins present to form alkylate, i. e., branched-chain paraffins having 7 and more carbon atoms per molecule without any substantial alkylation of the isoparaffin with the ethylene whether as such or as the ethyl ester of the acid. The alkylation may take place in the same zone with the absorption in which case the isoparaffin is introduced to the combined absorption-alkylation zone and is alkylated with the olefin higher than ethylene simultaneously with the conversion of the ethylene to the ethyl ester of the acid.

It is preferred to employ such conditions in the alkylation step that substantially no ester of propylene and higher olefin appears in the alkylation effluent and that substantially no ethylene is caused to alkylate the isoparaffin. It is further preferred that undesirable side reactions such as polymerization, formation of heavy or tarry material, etc., be kept at a minimum.

Selection of suitable conditions for carrying out the alkylation will be within the skill of the art in the light of this specification. For example, the concentration of the higher aliphatic olefin should be such that it will alkylate the isoparaffin preferentially with respect to the ethylene. Optimum conditions will depend upon many factors such as composition of feed, rates of feed, individual preferences of operators, etc. Operating conditions for a particular situation may be determined readily by means of laboratory experiments, pilot plant runs or by actual large scale plant operation.

The temperature at which the alkylation is conducted may be that conventionally used in alkylation of the same isoparaffins using the same acid catalyst. However, it should not be so high that undesirable side reactions take place to an objectionable extent. Usually a temperature of at least 70° F. will be employed. Temperatures ranging up to 300° F. may be used. The temperature used may depend upon the acid catalyst employed. For example, higher temperatures may be employed when hydrofluoric acid is used than when sulfuric acid is employed, without deleterious side reactions such as polymerization, excessive tar formation, charring, etc.

The pressure at which the alkylation is conducted may vary widely but should be at least sufficient to maintain all of the ingredients present in the liquid phase. The pressure may range up to several thousand pounds per square inch.

The contact time in the alkylation zone may vary over wide limits depending upon composition and proportions of reactants, concentration of acid, ratio of isoparaffin to olefin, and other factors. Usually the contact time will fall within the range of from 3–60 minutes. The alkylation is carried out in any suitable type of reactor which effects the desired intimacy of contact. It is often preferred to use a reactor of the type known as a "Stratco contactor" which accomplishes the desired rapid and intimate mixture and enables close control of reaction temperature. As is common in the alkylation art, the use of an excess of isoparaffin over olefin is highly preferred, ratios of isoparaffin ranging from 5:1 to 10:1 or even higher often being employed.

*Treatment of alkylation effluent*

The alkylation effluent, which is ordinarily an emulsion of acid and hydrocarbon phases, is passed to the usual type of settler wherein it is allowed to separate by gravity into two phases, namely, a lower acid phase and an upper hydrocarbon phase. The hydrocarbon phase contains substantially all of the alkylate. The ethyl ester of the acid may appear in the acid phase or in the hydrocarbon phase or may be distributed between both depending upon the acid employed and other conditions. When sulfuric acid is used the ethyl esters thereof appear predominantly in the acid phase and are recovered therefrom as ethyl alcohol by hydrolysis with water.

Usually the hydrocarbon phase and the acid phase are separately withdrawn from the settler and are treated in any suitable manner to recover the alkylate and the ethyl alcohol therefrom. In unusual circumstances water may be added to the alkylation effluent before separate withdrawal of the hydrocarbon and acid phases, thereby converting the ethyl esters of the acid to ethyl alcohol which is thereafter recovered in any suitable manner. Usually, however, the hydrocarbon and the acid layers are separately withdrawn from the settler and are separately treated to recover the ethyl alcohol and the alkylate.

Where sulfuric acid is employed, I prefer to recycle a portion of the acid layer to the absorption zone where its content of ethyl ester of sulfuric acid serves to catalyze the absorption of ethylene. The remaining portion of the acid layer may be passed to the hydrolysis for conversion of the ethyl ester to ethyl alcohol and recovery of the latter. In some cases a portion of the acid layer may be recycled directly to the alkylation unit although when it is recycled to the absorber it is thereby recycled to the alkylation unit.

Hydrolysis of ethyl ester

The hydrolysis of the ethyl ester of the alkylation acid is accomplished in any suitable manner and does not per se constitute my invention. Methods of hydrolyzing ethyl esters of sulfuric acid to ethanol are well known in the art. For example, when sulfuric acid is used, the hydrolysis may be accomplished by the simple addition of a suitable amount of water to the withdrawn acid phase. For example, the acid phase may be diluted to a strength of 35% sulfuric acid by adding water at 90–100° C. and the mixture may then be run quickly into a flash zone maintained at 110–120° C. by steam jacketing whereby the alcohol is rapidly flashed off and is recovered from the resulting vapors in any manner.

Where hydrofluoric acid is used as the absorption medium and as the alkylation catalyst, the ethyl fluoride-containing material may be treated in accordance with the principles set forth in the copending applications of F. E. Frey, Ser. Nos. 521,833, filed Feb. 10, 1944, now U. S. Patent 2,484,702 and 559,115, filed Oct. 17, 1944, now U. S. Patent 2,457,882, to effect hydrolysis of the ethyl fluoride to ethyl alcohol. As is pointed out in said applications, the presence of some free HF in addition to the hydrating agent (water) is desirable in the hydrolysis of ethyl fluoride. The hydrolysis mixture is then treated in any suitable manner, conveniently in the manner set forth in said copending applications, to recover the ethyl alcohol.

Embodiment of Figure 1

In the preferred modification of the invention illustrated in Fig. 1, a cracked gas stream is fed via line 1 into an absorber-alkylator 2, together with 96–98% sulfuric acid introduced via line 3 at a point near the top of unit 2 and a large excess of isobutane introduced at any suitable point via line 4. The absorber-alkylator 2 is provided with an efficient stirrer or otherwise equipped for intimate and rapid contacting and is maintained at a temperature of from 20 to 80° C. and under a pressure sufficient to maintain the reactants in the liquid state. Light gases such as hydrogen, methane, etc., are withdrawn overhead via line 5 and, with or without partial condensation, passed to fractionation means 6, or any equivalent means which will condense the isobutane, for the recovery of isobutane which is removed as bottom product via line 7 and recycled via line 8 to unit 2 at any suitable point therein, conveniently at the same level as line 4. The light gases, namely, hydrogen and methane, together with any ethane and propane and any other light inerts, are removed via line 9 and may be passed to the fuel system.

The olefin feed and the sulfuric acid countercurrently contact each other in unit 2 and alkylation of the isobutane with olefins above ethylene takes place simultaneously. The exact location of the alkylation zone may vary widely.

If desired unit 2 may be operated as a fractionating column or, more accurately, an extractive distillation column, with reboiling of the bottoms and refluxing of the top with condensed overhead vapors. For this type of operation the olefin feed is usually introduced at a point near the middle of the column while the sulfuric acid is introduced near the top, usually just below the liquid reflux. By operating in this manner the reaction products, namely, ethyl ester of the sulfuric acid and alkylate, are rapidly removed from the zone of reaction thereby expediting the reaction by favorably displacing the equilibrium. If desired one or more trap-out trays may be provided in the column at a point below that wherein the reaction takes place, the acid layer on the trap-out tray being withdrawn and introduced into the column at a point above the reaction zone. In this way the ethyl sulfuric acid may be maintained at an artificially high level in the absorption section of the column with consequent catalysis of ethylene absorption and other advantages may be attained.

By carrying out fractional distillation or rectification simultaneously with olefin absorption and alkylation in the manner just described many advantages are attainable and such mode of operation is often preferred. One advantage is that the fractionation may cause particularly favorable concentrations and conditions to exist in the several portions of the column, compare U. S. Patent to L. G. Molique 2,365,426, granted Dec. 19, 1944, and my own Patent 2,380,010, granted July 10, 1945.

The liquid hydrocarbons and acid leaving absorption-alkylation unit 2 are passed via line 10 to acid settler 11 of the usual type in which the liquids are allowed to separate into a lower acid phase and an upper hydrocarbon phase. The acid phase is withdrawn via line 12. A portion may be recycled to unit 2 via line 13. The balance may be passed via line 14 to a hydrolysis unit 15 where it is subjected to conventional hydrolysis for the production of ethyl alcohol which may be withdrawn via line 16.

The hydrocarbons which separate in settler 11 are passed via line 17 to fractionation equipment 18 which effects separation into alkylate withdrawn via line 19 and isobutane which is recycled via line 20 to unit 2.

Embodiment of Figure 2

In this modification the absorption and alkylation steps are carried out separately. The olefin-containing feed stream flowing in line 21 enters absorber 22 in which it is contacted countercurrently with 96–98% sulfuric acid under conditions of temperature and pressure favorable to complete absorption of the olefins. The sulfuric acid absorbing medium is introduced via line 23 at a point near or at the top of the absorption column 22. The fixed gases, methane and hydrogen, are withdrawn via line 24. If desired, suitable means may be provided for liquefying the condensible portion of such gases and returning same to the top of the column as reflux. The bottom of absorber 22 may likewise be reboiled if deemed desirable. The sulfuric acid-olefin stream is withdrawn from the bottom of the column via line 25 and passed after cooling to a suitable temperature into alkylation reactor 26. A stream of isobutane is introduced to alkylator 26 via line 27. Additional isobutane may be introduced by addition to the sulfuric acid-olefin stream by means of line 28. Alkylation reactor 26 is provided with an efficient stirring apparatus and is maintained at a temperature in the range of 20–40° C. and under pressure sufficient to keep the reactants in a liquid state. It is desirable to maintain a high ratio of isobutane to sulfuric acid and a temperature such that alkylation of propylene and higher olefins will occur without appreciable alkylation of ethylene. The products of the alkylation reaction are withdrawn via line 29 and passed to an acid settler 30 where separation into an acid layer and a hydrocarbon layer takes place. The hydrocarbon layer is fractionated in equipment 31 into a fraction of alkylate withdrawn via line 32 and a fraction of isobutane recycled via line 33. The acid layer is partially recycled by line 34 and the remainder is passed via line 35 to hydrolysis and alcohol recovery system 36.

Many advantages of the process of the present invention will be apparent to those skilled in the art from the foregoing description. The principal advantage is that ethyl alcohol substantially free from higher alcohols, especially propyl or butyl alcohols, is produced from a cracked gas stream or other olefin-bearing gases containing ethylene together with higher olefins. Another advantage is that the higher olefins are converted into valuable hydrocarbons which are readily recovered from the hydrocarbon phase as by-products of the process. Another advantage is that the olefins are removed from the olefin-containing stream in a highly advantageous manner. Another advantage is that the same material functions as the absorbing liquid in the absorption zone and as the alkylation catalyst. Another advantage is that recycle of the acid layer to the absorber catalyzes the absorption of ethylene. Many other advantages will be evident to those skilled in the art.

The copending application of William Whitney Weinrich, Ser. No. 616,931, filed Sept. 17, 1945, is directed to an improvement in or modification of the generic concept of the present invention. In accordance with said improvement the isoparaffin is used as the absorption medium in the absorption zone and the ethylene is converted to ethyl ester of the alkylation acid catalyst simultaneously with the alkylation of the isoparaffin with the olefin higher than ethylene derived from the feed.

I claim:

1. The process of converting ethylene in a mixture containing same together with at least one higher aliphatic olefin to ethyl alcohol and causing said higher olefin to alkylate an alkylatable isoparaffin hydrocarbon which comprises absorbing the olefin content of said mixture in an alkylation acid which is catalytically active toward the alkylation of isoparaffins with olefins higher than ethylene but normally substantially inactive with respect to alkylation of isoparaffins with ethylene, maintaining a concentration of said higher aliphatic olefin such that it will alkylate the isoparaffin preferentially in respect of the ethylene, causing said ethylene to react with said acid to form the ethyl ester thereof, effecting alkylation of a molar excess of said isoparaffin hydrocarbon selectively with said higher olefin by means of said acid as an alkylation catalyst while preventing substantially alkylation with ethylene and with the ethyl ester of said acid, hydrolyzing said ethyl ester to ethyl alcohol, and recovering alkylate and ethyl alcohol as products of the process.

2. The process of claim 1 wherein said acid catalyst is concentrated sulfuric acid of a strength of at least 90% by weight.

3. The process of claim 1 wherein said catalyst is substantially anhydrous hydrofluoric acid.

4. The process of claim 1 wherein said isoparaffin is isobutane.

5. The process of converting ethylene in a normally gaseous mixture containing same together with at least one higher aliphatic olefin and at least one material selected from the group consisting of hydrogen and methane to ethyl alcohol and also causing said higher olefin to alkylate an alkylatable isoparaffin hydrocarbon which comprises absorbing the olefin content of said mixture in sulfuric acid of a strength of at least 90% by weight, maintaining a concentration of said higher aliphatic olefin such that it will alkylate the isoparaffin preferentially in respect of the ethylene, causing said ethylene to react with said sulfuric acid in the absorption step to form the ethyl ester of sulfuric acid, withdrawing from the absorption step said material selected from the group consisting of hydrogen and methane, effecting alkylation of a molar excess of said isoparaffin hydrocarbon selectively with said higher olefin by means of said sulfuric acid as an alkylation catalyst while preventing substantially alkylation with ethylene and with the ethyl ester of sulfuric acid, hydrolyzing said ethyl ester of sulfuric acid to ethyl alcohol, and recovering alkylate and ethyl alcohol as products of the process.

6. The process of converting ethylene in a normally gaseous mixture containing same together with at least one higher olefin and at least one material selected from the group consisting of hydrogen and methane to ethyl alcohol and also causing said higher olefin to alkylate an alkylatable isoparaffin hydrocarbon which comprises feeding said mixture into a combined absorption-alkylation zone, introducing a molar excess of said isoparaffin into said zone, maintaining a concentration of said higher aliphatic olefin such that it will alkylate the isoparaffin preferentially in respect of the ethylene, introducing sulfuric acid of a strength of at least 90% by weight into said zone as an olefin absorption medium and an alkylation catalyst, in said zone effecting absorption of the olefin content of said mixture in said acid while withdrawing said material selected from the group consisting of hydrogen and methane, simultaneously with said absorption in said zone causing said ethylene selectively to react with said acid to form the ethyl ester of sulfuric acid and said higher olefin selectively to alkylate said isoparaffin while preventing substantially alkylation with ethylene and with the ethyl ester of sulfuric acid, hydrolyzing said ethyl ester of sulfuric acid to ethyl alcohol, and recovering alkylate and ethyl alcohol as products of the process.

7. The process of claim 6 wherein the reaction effluent from said absorption-alkylation zone is withdrawn therefrom and caused to separate into two layers, namely, a hydrocarbon layer and an acid layer, wherein said hydrocarbon layer is treated to recover the alkylate formed by said alkylation reaction, wherein the acid layer is in part passed to a hydrolysis step in which said ethyl ester of sulfuric acid is hydrolyzed to ethyl alcohol and is in part recycled to said absorption-alkylation zone where, by reason of its ethyl ester of sulfuric acid content, it serves to catalyze the absorption of ethylene.

8. The process of converting ethylene in a normally gaseous mixture containing the same together with at least one higher olefin and at least one material selected from the group consisting of hydrogen and methane to ethyl alcohol and also causing said higher olefin to alkylate an alkylatable isoparaffin hydrocarbon which comprises feeding said mixture into an absorption zone and there absorbing the olefin content of said mixture in sulfuric acid of a strength of at least 90% by weight while withdrawing said material selected from the group consisting of hydrogen and methane, maintaining a concentration of said higher aliphatic olefin such that it will alkylate the isoparaffin preferentially in respect of the ethylene, in said absorption zone causing said ethylene to react with said sulfuric acid to form the ethyl ester thereof, withdrawing the sulfuric acid containing the dissolved olefins from the absorption zone and feeding same to an alkylation zone, introducing a molar excess of said isoparaffin into said alkylation zone, in said alkylation zone causing said higher olefin selectively to alkylate said isoparaffin while preventing substantially alkylation with ethylene and with the ethyl ester of sulfuric acid, hydrolyzing said ethyl ester of sulfuric acid to ethyl alcohol, and recovering ethyl alcohol and alkylate as products of the process.

9. The process of claim 8 wherein the mixture in said alkylation zone is withdrawn therefrom and caused to separate into two layers, namely, a hydrocarbon layer and an acid layer, wherein the hydrocarbon layer is treated to recover the alkylate contained therein, wherein the acid layer is withdrawn and is in part passed to a hydrolysis step wherein said ethyl ester of sulfuric acid is hydrolyzed to ethyl alcohol and is in part recycled to said absorption zone where, by reason of its ethyl ester of sulfuric acid content, it serves to catalyze the absorption of ethylene.

10. The process of claim 5 wherein the effluent from said alkylation step is caused to separate into two layers, namely, a hydrocarbon layer and an acid layer, and wherein alkylate is recovered from said hydrocarbon layer and ethyl alcohol is recovered from said acid layer by hydrolysis of the ethyl ester of sulfuric acid contained therein to ethyl alcohol.

11. A process for the simultaneous production of ethyl alcohol and alkylate composed of branched chain paraffins having 7 or more carbon atoms per molecule from cracked gas containing ethylene and at least one higher aliphatic olefin together with substantial quantities of each of hydrogen, methane and paraffins corresponding to the olefins present, which comprises continuously introducing said cracked gas into a vertical absorption-reaction zone at an intermediate point therein, continuously introducing sulfuric acid of 96–98 per cent strength into the top of said zone and causing same to descend therein countercurrent to said gas, thereby effecting absorption of substantially all of the ethylene and higher olefin in said acid while allowing the hydrogen and paraffins to pass through undissolved, said acid being introduced in substantial molecular excess over the olefin present, simultaneously introducing into said zone isobutane in amount such as to give a ratio of isobutane to olefin of at least 5:1, agitating the material in said zone, maintaining said zone at a temperature of at least 20° C. and under a pressure sufficient to maintain the reactants in liquid phase, carrying out fractional distillation in said zone with reboiling of the bottom of said zone and refluxing of the top thereof, withdrawing the undissolved gases, condensing overhead vapors from said withdrawn gases, returning the resulting condensate to said zone as reflux therefor, effecting in said zone simultaneous conversion of substantially all of said ethylene to the ethyl ester of sulfuric acid and alkylation of said isobutane selectively with substantially all of said olefin higher than ethylene to form said alkylate to the substantial exclusion of alkylation of isobutane with ethylene and the ethyl ester of said acid, continuously withdrawing from the bottom of said zone reaction mixture composed of acid and hydrocarbon, passing same to a settling zone and there causing same to separate into an acid phase and a hydrocarbon phase, separately withdrawing said phases, fractionating said hydrocarbon phase to recover said alkylate as one product of the process, recycling a portion of said acid phase to the top of said zone whereby its content of ethyl ester of sulfuric acid serves to catalyze absorption of ethylene therein, hydrolyzing another portion of said acid to convert the ethyl ester of sulfuric acid contained therein to ethyl alcohol, and recovering the ethyl alcohol so produced as another product of the process.

12. A process for the simultaneous production of ethyl alcohol and alkylate composed of branched chain paraffins having 7 or more carbon atoms per molecule from cracked gas containing ethylene and at least one higher aliphatic olefin together with substantial quantities of each of hydrogen, methane and paraffins corresponding to the olefins present, which comprises continuously introducing said cracked gas into a vertical absorption-reaction zone at an intermediate point therein, continuously introducing hydrofluoric acid of 95–99% strength into the top of said zone and causing same to descend therein countercurrent to said gas, thereby effecting absorption of substantially all of the ethylene and higher olefin in said acid while allowing the hydrogen and paraffins to pass through undissolved, said acid being introduced in substantial molecular excess over the olefin present, simultaneously introducing into said zone isobutane in amount such as to give a ratio of isobutane to olefin of at least 5:1, agitating the material in said zone, maintaining said zone at a temperature of at least 20° C. and under a pressure sufficient to maintain the reactants in liquid phase, carrying out fractional distillation in said zone with reboiling of the bottom of said zone and refluxing of the top thereof, withdrawing the undissolved gases, condensing overhead vapors from said withdrawn gases, returning the resulting condensate to said zone as reflux therefor, effecting in said zone simultaneous conversion of substantially all of said ethylene to the ethyl ester of hydrofluoric acid and alkylation of said isobutane selectively with substantially all of said olefin higher than ethylene to form said alkylate to the substantial exclusion of alkylation of isobutane with ethylene and the ethyl ester of said acid, ontinuously withdrawing from the bottom of aid zone reaction mixture composed of acid and ydrocarbon, passing same to a settling zone and here causing same to separate into an acid phase nd hydrocarbon phase, separately withdrawing aid phases, fractionating said hydrocarbon hase to recover said alkylate as one product of he process, recycling a portion of said acid phase o the top of said zone whereby its content of thyl ester of hydrofluoric acid serves to catalyze bsorption of ethylene therein, hydrolyzing another portion of said acid to convert the ethyl ster of hydrofluoric acid contained therein to thyl alcohol, and recovering the ethyl alcohol so roduced as another product of the process.

13. The process of claim 1 wherein said acid atalyst is concentrated sulfuric acid of a rength of at least 90 percent by weight; wheren said higher aliphatic olefin is selected from the lass consisting of propylene, butylene and penene; and wherein said alkylatable isoparaffin ydrocarbon is selected from the class consisting f isobutane, isopentane and isohexane.

14. The process of claim 1 wherein said acid atalyst is substantially anhydrous hydrofluoric cid; wherein said higher aliphatic olefin is selected from the class consisting of propylene, butylene and pentene; and wherein said alkylatable isoparaffin hydrocarbon is selected from the class consisting of isobutane, isopentane and isohexane.

15. The process of claim 8 wherein said higher aliphatic olefin is selected from the class consisting of propylene, butylene and pentene and wherein said alkylatable isoparaffin is selected from the class consisting of isobutane, isopentane and isohexane.

PHILIP M. ARNOLD.

REFERENCES CITED

The following references are of record in the file of this patent:

UNITED STATES PATENTS

| Number | Name | Date |
| --- | --- | --- |
| 1,365,048 | Ellis | Jan. 11, 1921 |
| 1,486,646 | Ellis | Mar. 11, 1924 |
| 1,859,241 | Merley | May 17, 1932 |
| 2,014,740 | Larson | Sept. 17, 1935 |
| 2,351,464 | Voorhies | June 13, 1944 |
| 2,385,123 | Atkins | Sept. 18, 1945 |